United States Patent [19]
Lo et al.

[11] Patent Number: 5,651,264
[45] Date of Patent: Jul. 29, 1997

[54] FLEXIBLE PROCESS CONTROLLER

[75] Inventors: Lai Lo, Toronto; Dominic Leung, Brampton; Piotr Grudzinski, Toronto, all of Canada

[73] Assignee: Siemens Electric Limited, Brampton, Canada

[21] Appl. No.: 542,567

[22] Filed: Oct. 13, 1995

Related U.S. Application Data

[63] Continuation of Ser. No. 376,537, Jan. 20, 1995, abandoned, which is a continuation of Ser. No. 85,277, Jun. 29, 1993, abandoned.

[51] Int. Cl.$^6$ .............................. F25B 1/00; G05D 15/00
[52] U.S. Cl. .............................. 62/230; 62/203; 165/218; 236/78 D
[58] Field of Search .............................. 62/230, 181, 203; 165/218; 236/78 D

[56] References Cited

U.S. PATENT DOCUMENTS

| | | | |
|---|---|---|---|
| 4,060,997 | 12/1977 | Shultz et al. | 62/180 |
| 4,439,997 | 4/1984 | Cantley | 62/175 |
| 4,463,574 | 8/1984 | Spethmann et al. | 62/175 |
| 4,483,152 | 11/1984 | Bitondo | 62/175 |

*Primary Examiner*—William E. Wayner
*Attorney, Agent, or Firm*—Donald M. Boles

[57] ABSTRACT

A flexible process controller for coordinating the operations of various equipment is disclosed. Briefly stated, in the preferred embodiment of the present invention, various parameters of the sub-systems in a HVAC system are monitored and made alterable or changeable. These parameters are transmitted to and controlled by a flexible process controller which thereafter cooperates with a motor drive controller. Logic incident to and resident in the flexible process controller consider the various parameters monitored and allow the user or the system to minimize power consumption amongst one or more of the sub-systems while maximizing efficiency and operability.

10 Claims, 15 Drawing Sheets

FIG. 2

| Dry Bulb | Wet Bulb | Rel Hum | Amb Press | Day Date Time |
|---|---|---|---|---|
| °F | °F | % | psi | |

Sys Power  Sys kW/Ton  Comp kW/Ton  Bldg Load  DONE

Chilled Water

| Return | °F |
| Supply | °F |
| Flow | GPM |

Primary Pump

| Dif Pres | psi |
| Speed | % |

Secondary Pump

| AHU Pres | psi |
| Dif Pres | psi |
| Speed | % |

Condenser

| Press | |
| Enter | |
| Liquid | |

Evaporator

| Press | |
| Leave | |
| Liquid | |

Compressor

| Oil Pres | psi | | Current | A |
| Oil Temp | °F | | Power | kW |
| Oil Brng | °F | | Vane | ° |
| START | STOP | | Speed | % |

C.TOWER

Fan  Speed %

Condenser Water

| Cold | °F |
| Hot | °F |
| Flow | GPM |
| Speed | % | delay     cool_down
normal_opr  start_up
            shut_down

Compressor and Vane Control

Control Level
- <•> manual
- < > temperature

Speed ref [ ]

✓ OK    ✗ Cancel

Rated chiller load [ ] (tons)
Rated condenser load [ ] (BTU)
C1 [ ]    N_0 [ ]
Q [ ]     N_1 [ ]
Temp set point [ ] (deg F)
Start up delay [ ] (min)
Current limit [ ] A Vane opening limits (deg)
- Start up [ ]
- Cool down [ ]
- Normal opr [ ]
- Shut down [ ]
- Vane P [ ]
- Vane I [ ]

FIG. 3A

Compressor and Vane Control

Control Level
- < > manual
- <•> automatic

✓ OK    ✗ Cancel

Tower fan speed control

Controlling:
- <•> manual
- < > temperature
- < > optimization

Speed ref

☑ OK
☒ Cancel

Outdoor Interlock   Minimum Cdn. Temp.

PID loops

| | Prop.Band | Reset Rate |
|---|---|---|
| Cooling water temp | | |
| Optimization | | |

FIG. 4B

Tower fan speed control

Controlling:
- < > manual
- <•> temperature
- < > optimization

Cold

A_0

☑ OK
☒ Cancel

FIG. 4C

Tower fan speed control

Controlling::
- < > manual
- < > temperature
- <•> optimization

Approach

B_0

☑ OK
☒ Cancel

FIG. 5A

Cooling Water Pump Control

Controlling:
- <•> speed manually
- < > flow
- < > differential temp

Speed ref

✓ OK
✗ Cancel

Min values
- flow
- hot water press
- speed ref

PID loops:
|  | Prop.Band | Reset Rate |
|---|---|---|
| Flow control |  |  |
| Differential Temp |  |  |
| Hot Water Press |  |  |

FIG. 5B

Cooling Water Pump Control

Controlling:
- < > speed manually
- <•> flow
- < > differential temp

Flow stpt

C_0

✓ OK
✗ Cancel

FIG. 5C

Cooling Water Pump Control

Controlling:
- < > speed manually
- < > flow
- <•> differential temp

Diff temp

D_0

✓ OK
✗ Cancel

Primary Chilled Water Pump

Controlling:
- <•> speed manually
- < > flow
- < > differential temp

Speed ref
[  ]
[  ]

✓ OK
✗ Cancel min flow   diff press   min ref
[  ]       [  ]         [  ]

|  | Prop.Band | Reset Rate |
|---|---|---|
| Flow Control | [  ] | [  ] |
| Differential Temp | [  ] | [  ] |
| Differential Press | [  ] | [  ] |

FIG. 6A

Primary Chilled Water Pump

Controlling:
- < > speed manually
- <•> flow
- < > differential temp

Flow stpt
[  ]
E_0
[  ]

✓ OK
✗ Cancel

FIG. 6B

Primary Chilled Water Pump

Controlling:
- < > speed manually
- < > flow
- <•> differential temp

Diff temp
[  ]
F_0
[  ]

✓ OK
✗ Cancel

FIG. 6C

Secondary Chilled Water Pump Control

Control Level
- <•> manual
- < > header press
- < > AHU's press

Min Values
- header press
- Speed ref

[ ✓ ] OK
[ ✗ ] Cancel

Speed ref
[   ] [   ] [   ]

PID Loops
|              | Prop Band | Reset Rate |
|--------------|-----------|------------|
| header press |           |            |
| AHU's        |           |            |

FIG. 7A

Secondary Chilled Water Pump Control

Control Level
- < > manual
- <•> header press
- < > AHU's press

Min Values
- header press
- speed ref

[ ✓ ] OK
[ ✗ ] Cancel

| Header | J_0 | J_1 |
|--------|-----|-----|
|        |     |     |

FIG. 7B

Secondary Chilled Water Pump Control

Control Level
- < > manual
- < > header press
- <•> AHU's press

Min Values
- header press
- speed ref

[ ✓ ] OK
[ ✗ ] Cancel

| AHU's | J_0 | J_1 |
|-------|-----|-----|
|       |     |     |

FIG. 7C

FLEXIBLE PROCESS CONTROLLER

CROSS-REFERENCE TO RELATED APPLICATION

This is a continuation of Ser. No. 08/376,537 filed Jan. 20, 1995, abandoned which is a continuation of U.S. Ser. No. 08/085,277 filed Jun. 29, 1993, now abandoned.

FIELD OF THE INVENTION

This invention relates, generally, to flexible process controllers and more particularly to a process controller for coordinating the operation of various equipment in systems such as process systems, commercial plants or HVAC systems and the like.

BACKGROUND OF THE INVENTION

As a result of increased operating costs as well as increased maintenance costs it is a common goal of process system users, manufacturers and facility owners to monitor various components, sub-systems and the like. This monitoring can accomplish a wide variety of goals, one of the most important being energy management. This is particularly so since energy costs comprise a substantial portion of the overall cost for operating a process system having even a moderate amount of complexity.

Such type of process systems can be varied but may include processes and manufacturing lines, assembly lines, as well as Heating Ventilation and Air-conditioning Control (HVAC) Systems. Such HVAC systems may be found in buildings ranging from small facilities with less than 10,000 ft.$^2$, including malls up to large multi-story buildings and large shopping malls incorporating at least hundreds of thousands of square feet.

Heretofore, attempts to reduce and coordinate energy control, although taking many forms, have essentially been time of use or occupancy sensor based. That is, devices which merely shut off equipment during a particular time of the day or do so by sensing that there is no user physically present. These types of occupancy or use sensors are becoming quite common to turn off lights or turn off heating and air-conditioning control systems. The most advanced improvements have merely used sensors such as outside temperature sensors which help decide how far in advance the system must be energized so that the system may operate at the desired comfort level at a predetermined time.

However, all of these systems essentially turn on or off the entire system or portion of the system without regard to or coordination between related components, subsystems and the like. Even when there has been an attempt to modulate system output, this modulation has consisted of merely speeding up or slowing down a single part of the system. One such example may be found in Canadian Patent Number 1,246,714. There, apparatus is used to control the speed of a brine pump motor with respect to refrigeration equipment utilized in an ice rink. That system uses sensors which are utilized to detect variations in the ice slab thermal load. The brine pump or refrigeration equipment motor is then varied in speed in response to such measurements. However, even there, there is no coordination between the brine pump and the refrigerator compressor. Hence, the individual components making up the system are not operatively interconnected.

However, the improvement of varying the speed is significant and has been tried in some circumstances. This approach of using an adjustable speed drive is now manufactured by a number of companies including the same assignee as the present invention. These adjustable speed drives are effectively solid state motor controllers which operate motors in the fractional horsepower range up through thousands of horsepower. These types of drives are retrofitable to existing motors and apparatus or may be provided as part of new installations. However, these drives are typically expensive and hence unless they are fully utilized, their cost can be hard to justify.

With the implementation of these electronic adjustable speed drives, true infinite variable speeds may be achieved as opposed to "step" functions by previously known devices. However, although these types of drives can and often are operated in conjunction with computers, they have heretofore only dealt with specific portions of a system. Therefore, they are in effect stand alone.

Adjustable speed drives have been made and adapted to operate with centrifugal fans, pumps, compressors, chillers and the like. However, even though efficiency is improved, these various sub-components do not communicate with each other.

It is therefore desirable and an object of the present invention to produce a method and apparatus which coordinates the operation of various equipment in a process system. It is also desirable and another object of the present invention to produce a method and system such as a flexible process controller which may control the HVAC system in a facility.

It is also desirable and another object of the present invention to produce a flexible process controller which coordinates the operation, through-put and use of a cooling tower, condenser pump, chiller, and chilled water pump in response to building load. It is still yet a further object of the present invention to produce a flexible process controller which anticipates building or process loads and controls or anticipates the control of same in a timely fashion with optimum energy savings and/or power factor control thereby minimizing operating costs.

Still a further object of the present invention is to produce a method and apparatus for minimizing maintenance and wear and tear or controlling same in a cost efficient or timely manner. Yet another object of the present invention is to monitor and sample various operating parameters, conditions and the like of various components in a process system.

Yet another object of the present invention is to produce a method and apparatus which may be computer controlled at a local or remote station. Still yet another object of the present invention is to produce a method and apparatus which operates with and may be coordinated with variable speed drives.

Still a further object of the present invention is to produce a method and apparatus which may be retrofitted to existing equipment or utilized with respect to new installations of process systems including HVAC systems. Yet another object of the present invention is to produce a method and apparatus which takes into account the operating characteristics and design parameter of specific components utilized therein. Still another object of the present invention is to produce a system and apparatus which may be easily controlled by an operator. Yet another object of the present invention is to produce a method and apparatus which may be easily modified by a user/operator. Still a further object of the present invention is to produce a method and apparatus having an operator interface which may be used or controlled via various displays such as a color graphics display, key pad with an alphanumeric screen or without a dedicated operator.

It is still a further object of the present invention to produce a method and apparatus which may be run in a windows type software environment utilizing a standard graphics user interface commonly known or available. Still a further object of the present invention is to produce a method and apparatus wherein the operator interface allows operation within certain limits or controls various subcomponents and adjacent components in response to changes instituted by the operator or one component or sub-system. Still a further object of the present invention is to produce a method and apparatus which can take full control of all the equipment of the entire process or may monitor just a portion thereof and which may provide notice to the operator of various maintenance considerations such as warnings, schedules and the like.

It is yet another object of the present invention to produce a method of flexible process control or operation comprising the steps of: (a) receiving data from instrumentation which monitors a plurality of parameters and overall operation of the plurality of operatively connected process control equipment; (b) interpolating the data from the instrumentation as a function of predetermined control and limit parameters; and (c) controlling the operation of at least one portion of the process control equipment and the overall operation and the interoperation of the operatively interconnected process control equipment in response to overall control criteria.

Still another object of the present invention is a device for flexible process control of a plurality of operatively interconnected process control equipment, comprising: instrumentation operatively connected to the process control equipment for monitoring a plurality of process control parameters and producing data representative thereof; a control devive operatively connected to the process control equipment for implementing process changes to the process control equipment; and a flexible process controller connected to the instrumentation and to the control device for coordinating the operation of at least one portion of the process control equipment, the overall operation and the interoperation of the plurality of operatively interconnected process control equipment in response to overall control criteria and as a function of data from the instrumentation.

BRIEF DESCRIPTION OF THE DRAWINGS

Reference may be now had to the accompanying drawings in which:

FIG. 2 shows the screen display configuration of a basic HVAC system;

FIGS. 3A & 3B show the basic screen display for compressor control;

FIGS. 4A, 4B and 4C indicate the basic screen or display configuration for a tower fan control;

FIGS. 5A, 5B and 5C show the standard screen display for a cooling water pump control;

FIGS. 6A, 6B and 6C show a standard screen configuration for a primary chilled water pump control;

FIGS. 7A, 7B and 7C indicate the standard screen display for a secondary chilled water pump control;

DETAILED DESCRIPTION OF THE PREFERRED EMBODIMENT

Overall Configuration and Principles of Operation

Figure 1A:
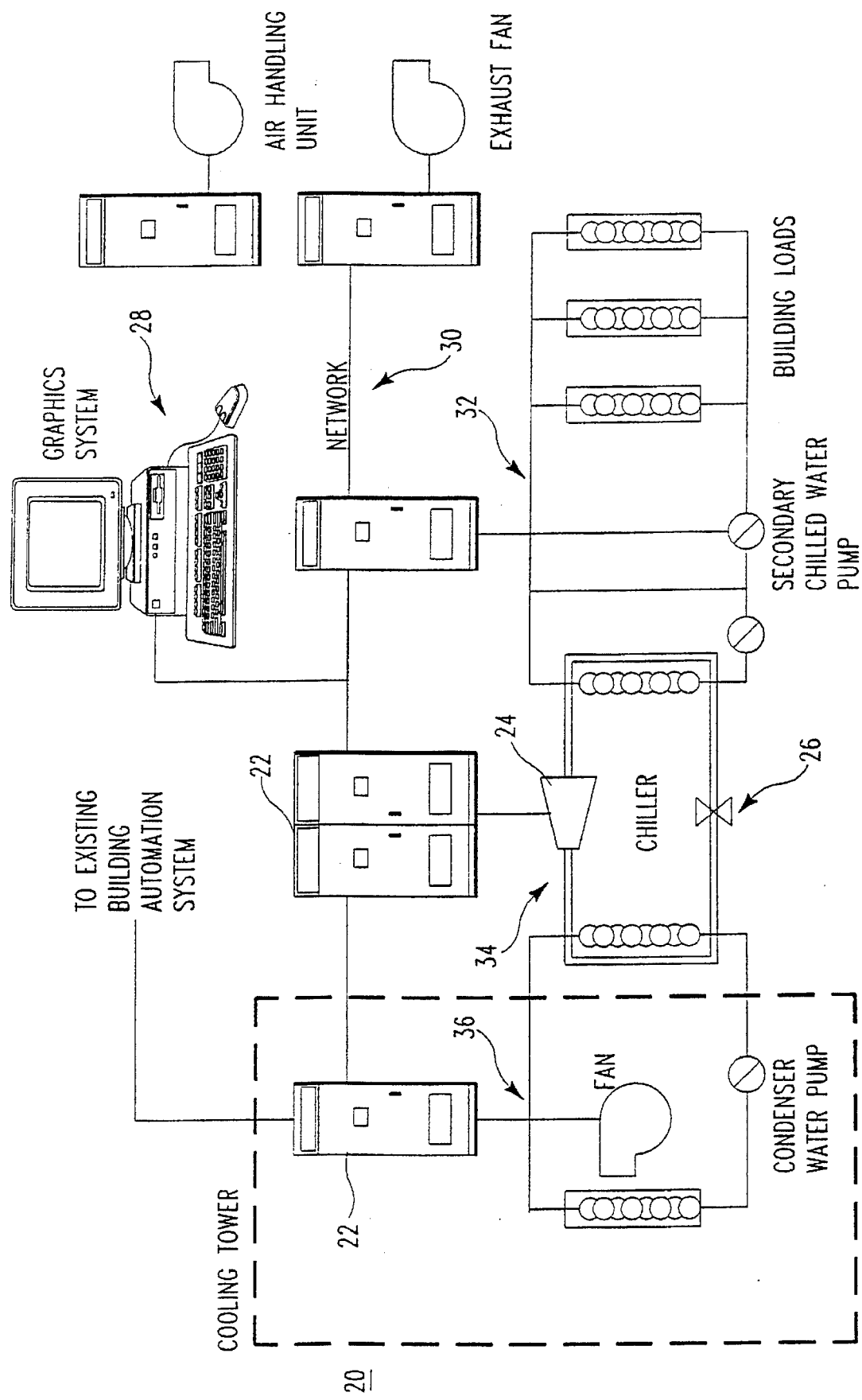
FIG. 1A is a block diagram representing various components of a HVAC system as contemplated by the present invention.

Refering now to FIG. 1A there is shown an HVAC Flexible Process Controller (FPC) System 20 as contemplated by the Preferred Embodiment of the present invention. It is to be understood however, that the present system may be adapted to various types of systems not related to HVAC such as a manufacturing operation including steel and sheet metal manufacturing, as these types of processes may easily be improved in performance by the act of coordinating the control of adjustable speed drives, and by the use of what I refer to as adaptive control.

Prior to a detailed description, an overall system configuration description is appropriate so as to more easily gain an understanding of the overall invention.

Variable speed drives 22 are interconnected with various portions of the mechanical equipment shown. These variable speed drives as previously mentioned, are used to control motors, in infinitely variable speeds and in an infinitely variable range, the many motors and pumps in an HVAC system. These variable speed drives are interconnected by a data communication link or bus 30 which are thereafter operatively connected to an operator interface or computer 28. It is to be understood that the data bus 30 and operator interface 28 may take a variety of forms and methods without departing from the spirit and scope of the present invention such as, for example, radio wave transmission, mainframe computers, and the like.

With respect to the HVAC system proper, it is well known that HVAC systems in buildings are generally comprised of three basic components, an air handling system shown generally at 32, a chiller system shown generally at 34 and a cooling tower system generally shown at 36. These subsystems are interconnected as shown and operatively transfer the building thermal load through the chiller to the cooling and vice-versa. Since these types of systems are readily known and available, their detailed operation will not be described herein.

Through each of these stages, a suitable refrigerant is passed through heat exchangers or the like. As previously mentioned, prior systems simply use variable speed drives 22 to control the components to which they were directly attached. Accordingly, there was no true detailed coordination of demand and output between any two of the components, such as, for example, between air handler system 32 and cooling tower 36. In the preferred embodiment of the present invention various instrumentation sensors and the like are utilized with each area in order to monitor various parameters as described fully below.

Figure 1B:
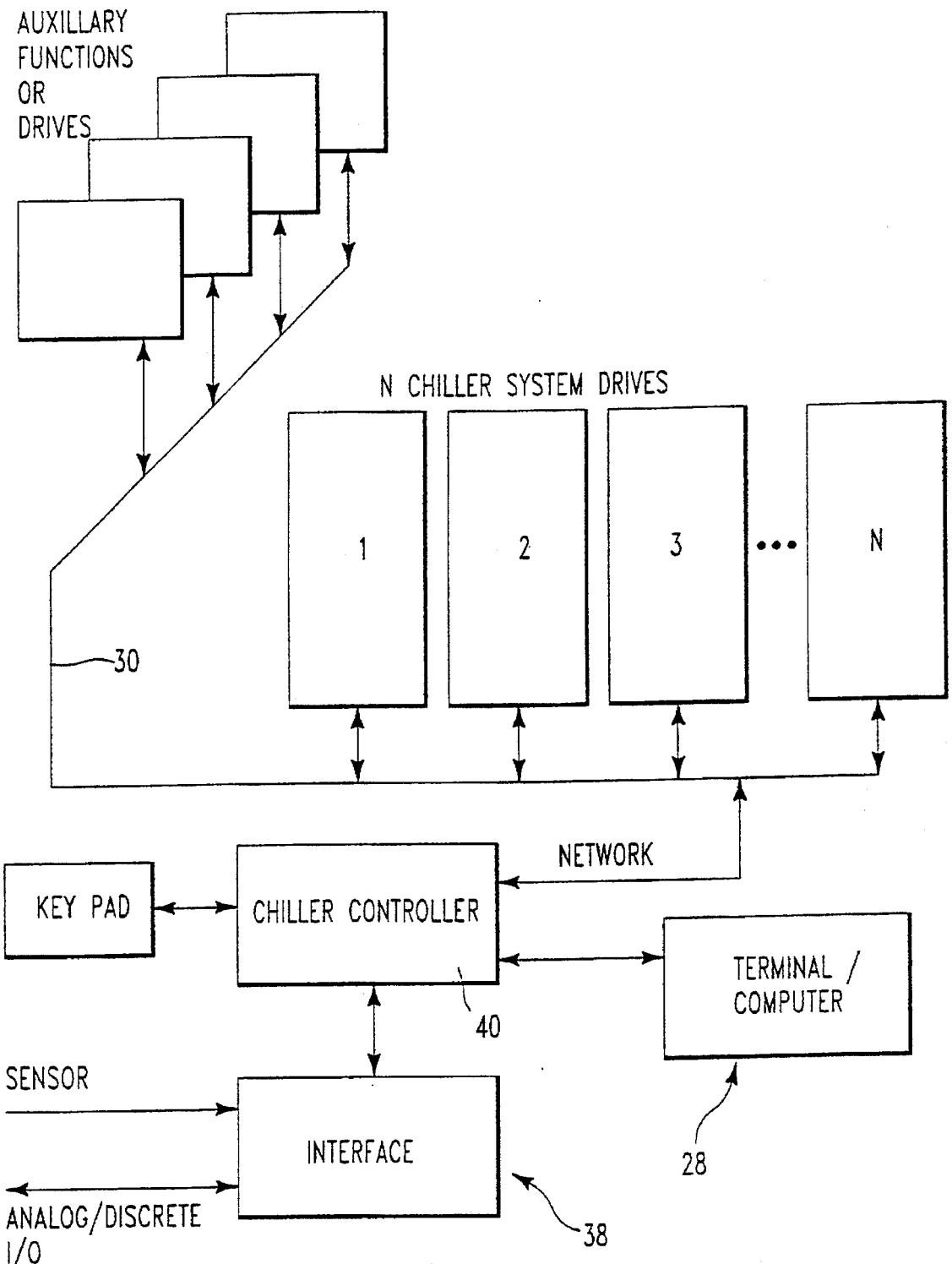
FIG. 1B is another block diagram showing interconnection of a HVAC Chiller System with other sub-systems of a HVAC system.

Referring now to FIG. 1B there is shown another block diagram indicating in slightly more detail the interconnection of the chiller portion 34 with variable speed drives and various other interfaces and equipment. Shown is a plurality of chiller system drives such as variable speed drives 22 as maybe found in a building or complex having a number of chillers. Interconnecting the drives and other components as described more fully below is a data bus 30 which is utilized for a communication link between the various components. Here, the various drives, 1, 2, 3, through N are interconnectable to auxiliary functions or drives such as for an air handling system 32, a cooling tower 36, power equipment (not shown) and the like. Also shown is how the data bus 30 interlinks the chiller controller 40, the instrumentation interface 38, the key pad and as well as the computer 28. Connected to and in communication with the instrumentation interface 38, are a plurality of sensors and input/output (I/O) devices which may be analog, digital, discrete or the like. These I/O devices and sensors are interconnected with various components of the chiller or the appropriate component which is to be controlled or monitored thereby defining and controlling the operating parameters of the apparatus as described more fully below.

These measurements cooperate with what is essentially a set of operating parameters/characteristics (hereinafter referred to as algorithm's) which define that particular components operating scheme or portfolio. Thereafter, the algorithms from the various other components cooperate with a similar algorithm or like which is used to control the entire HVAC system.

Figure 8:
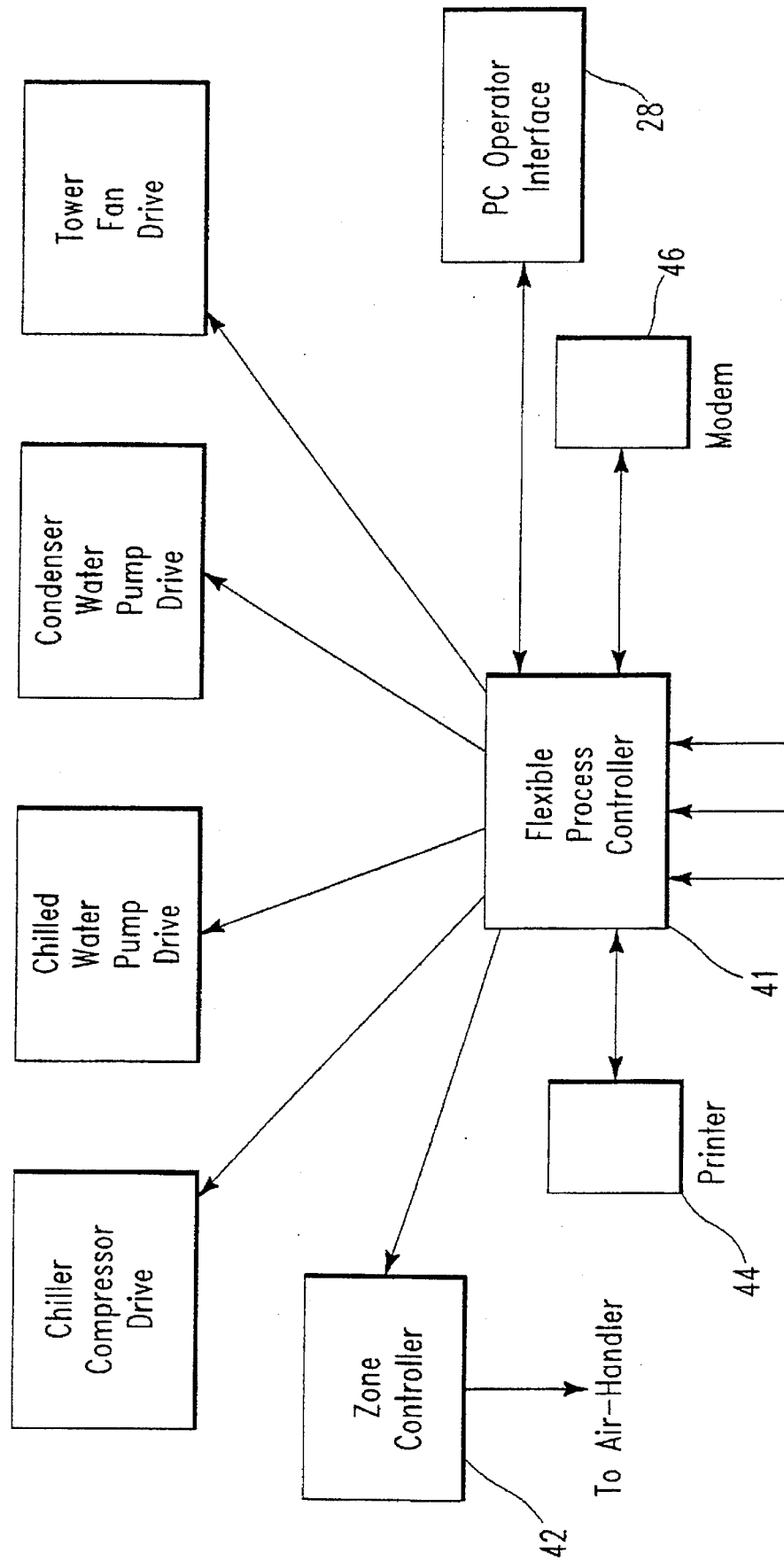
FIG. 8 shows a block diagram showing interconnection of the flexible process control of the present invention to various components of the chiller plant.
Figure 9:
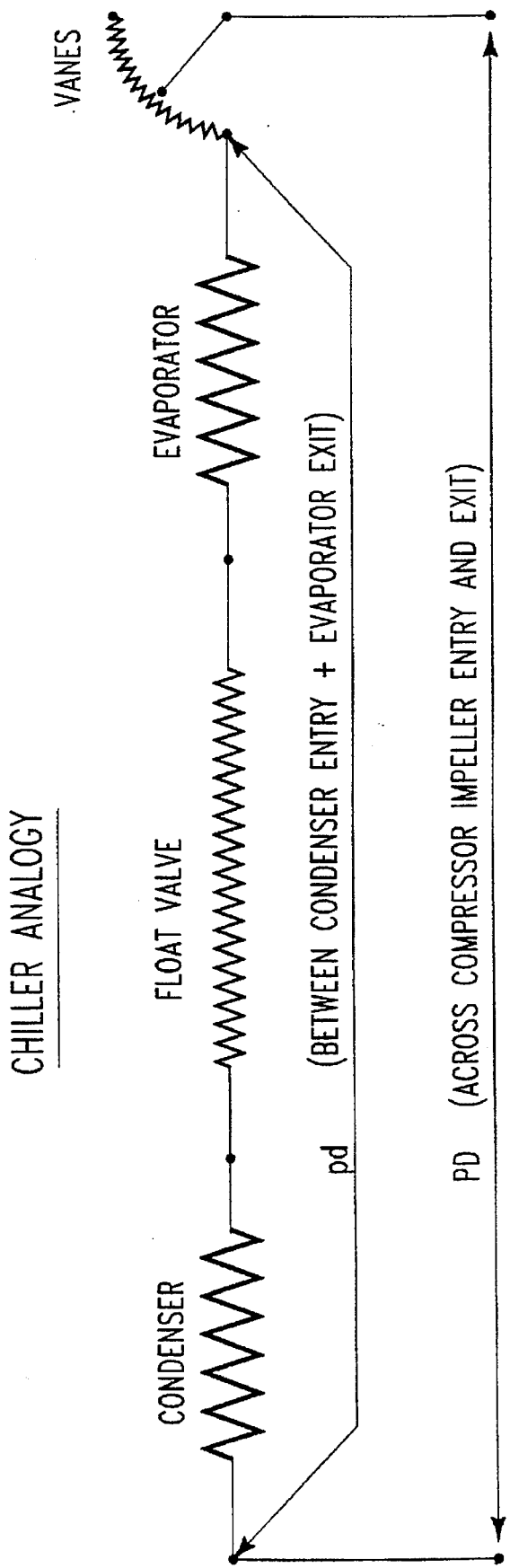
FIG. 9 is a schematic representation of a chiller.

Referring now to FIG. 8 there is shown a block diagram indicating interconnection of the flexible process controller of the present invention with respect to a typical chiller plant and in this respect is somewhat similar to that of FIG. 1B. Shown is the flexible process controller 41. The flexible process controller has sensors and I/O ports thereon and in that respect operates partially like that of the instrumentation interface 38 of FIG. 1A. Here it can be seen how the FPC 41 interacts with the four basic drives as shown in FIG. 1a for driving the four basic components of the HVAC system discussed herein. It is to be understood however, that the number of drives and therefore components of this type which the flexible process controller interacts with may be greater or fewer or of different types without departing from the spirit and scope of the present invention.

Also interconnected to the flexible process controller 41 is a zone controller which interacts with air handlers thereby distributing conditioned air throughout the building in which the HVAC system resides. A printer 44 is also shown which may be used for maintenance or tracking purposes although it is not required for proper operation of the present invention. A modem 46 is also provided which is, again, optional but may be used to communicate with other adjacent HVAC systems such as in a different area of the facility or simply for the purpose of remote control or data uploading or downloading as desired.

Again, a computer/operator interface 28 is provided which provides the link between the flexible process controller and the components which comprise the HVAC system. Sensor inputs are also connected with the flexible process controller 41 as are I/O ports as previously discussed with respect to interface 38 in FIG. 1B. It is to be understood that this interface could interact with the flexible process controller for the purpose of interfacing with sensors or providing I/O which may very well be another computer, programmable logic controller or separate and discrete components/modules. The purpose of the sensors and I/O ports is to provide the flexible process controller 41 with the necessary and correct operating parameters, conditions and information required in order to utilize a properly constructed operating "algorithm." It is to be understood that by algorithm is specifically meant that the various parameters and the like are interpolated so as to optimize performance, energy efficiency, maintenance or other characteristics and to that extent therefore takes into account the specific operating characteristics of the equipment utilized, the environment in which the HVAC system is present as well as the desired output or building load of the HVAC system.

Principles of Operation

Referring now to FIG. 2 there is shown a screen display as may be found on a personal computer or monitor screen operating in a windows type environment as found in the preferred embodiment of the present invention of a basic HVAC system. It is to be understood that the values shown as well as the actual placement and types of information displayed are merely exemplary. Accordingly, there is shown the ambient conditions indicated together with the date and time, such ambient conditions indicating the outside dry bulb temperature, the outside air relative humidity in percent, the atmosphere pressure in PSIA, all of which are read directly from sensors and all of which are fed into the flexible process controller 41 (FIG. 8). The wet bulb temperature is calculated by the flexible process controller using the outside dry bulb temperature and outside air relative humidity.

As can be readily seen by viewing FIG. 2, since a windows type environment is utilized, a mouse can be used simply to view or vary specific areas or parameters as shown and contemplated. However, it is to be understood that other types of controls may be utilized such as a key pad, key board, touch input screen, light pen or simple menus, without departing from the spirit and scope of the present invention.

In the preferred embodiment of the present invention, a simple click of the percent button for the appropriate area of the monitor screen will open the window for control of the respective equipment. This open window will then show modes of control as well as control parameters. In this regard, with respect to the chiller compressor there are two modes of control, manual and automatic. Similarly, with respect to each fan or pump there are 3 modes of control, a manual mode and two automatic modes. As indicated these may be selected in any order and controlled as described below.

With respect to the Chiller compressor, the automatic mode indicates that the flexible process controller will determine the reference speed of the chiller compressor according to the operating conditions and the load. However, the original vane controller will still control the load in order to maintain the set point at set-point chilled water supply temperature. An alternative approach dictate that an algorithm would use the speed to maintain the set point while the vanes are fixed at their maximum opening.

In both the manual and automatic modes, there are limit settings for both the reference speed and the vane opening. These settings can be either determined experimentally or from the operating characteristics provided by the manufacturer for the actual equipment.

Turning again to FIG. 2, the center section of the screen will display the data for the chiller's operating conditions as well as control buttons. Here it can be seen that the data displayed is all that is necessary and valuable for a quick overview of the chiller compressor operation. This displayed data includes the temperature and pressure of refrigerant in the condenser; the temperature and pressure of the refrigerant in the evaporator; the lubricating oil temperature and pressure; the compressor power in kilowatts; compressor current in amperes; vane opening in degrees and the reference speed in percent of full speed. It has been determined that by using the reference speed in percentage values the operator need not be aware of the actual maximum operating speed or value but only its percent in relation to maximum. Additionally, while temperatures shown are expressed in fahrenheit it is to be understood that centigrade may be utilized. Finally, the start and stop buttons indicated will respectively start and stop the entire system either immediately or response to a shut down sequence which may be pre-programmed.

The cooling tower fan and cooling water pump control are also shown on the left hand side of the screen shown at FIG. 2. There it can be seen that the tower fan reference speed (in percent of full speed) is displayed as well as that of the cooling pump. Additionally, the cooling water hot and cold temperatures in cooling water flow in gallons per minute are also shown. Again this has been found to be quite useful in that a quick reading of these statistics will indicate whether there is a problem with the equipment, i.e. blockages, broken lines, pipes or the like.

With respect to the fan speed control, in the preferred embodiment of the present invention there are two automatic modes. The first automatic mode maintains the set point cold cooling water temperature automatically according to the cooling water load while the second automatic mode maintains or utilizes the set point approach which is the difference between the cold cooling water temperature and the outside ambiant wet bulb temperature having automatic adjustment according to cooling water load. Further, the automatic and manual modes both have a limit setting for the fan speed so as to prevent damage to the fan or associated equipment should the flexible process controller attempt to operate the fan at too low or too fast a speed.

With respect to the cooling pump, the cooling pump speed control also has two automatic modes. The first maintains the set point cooling water flow rate (with automatic adjustment according to cooling water load) while the second mode maintains the set point hot-cold cooling water temperature differential with automatic adjustment according to cooling water load. Again, there are speed limit settings for the pump in both the manual and automatic modes.

As previously mentioned and as is present with the automatic modes in the present invention, the actual optimum settings are determined according to the desired operating characteristics and the actual equipment specifications by the appropriate manufacturer and may also incorporate actual operating perameters and conditions as determined during operation. In this fashion the present invention is individualized to the specific equipment system, its interoperability and inter-relationship as well as the actual evironment with which it is used.

Moving to the right hand section of FIG. 2 there is shown the primary and secondary chilled water pump values. There, the reference speeds are indicated again, in percent of full speed for the primary and secondary chilled water pumps. Also shown are the chilled water supply and return temperatures and chilled water flow in gallons per minute.

Again, there are automatic and manual modes. With respect to the automatic modes there are two which may be utilized. The first maintains a set-point chilled water flow rate with automatic adjustment according to chilled water load while the second maintains the set point chilled water supply return temperature differential with automatic adjustment according to chilled water load. As one can see, these are somewhat similar to the cooling pump speed control automatic modes and therefore there are speed limit settings for the pump in both the manual and automatic modes.

With respect to the secondary pump speed control there are again two automatic modes. The first maintains a set point chilled water differential pressure across the supply and return headers with automatic adjustment according to chilled water load. The second mode maintains the set-point chilled water differential pressure accross the inlet and outlet of the air handler, the reading of which is lowest or most critical. Again, there is automatic adjustment according to the chilled water load.

By viewing the second line of the display shown in FIG. 2, some of the most relevant data of the entire system may be seen. Here there is shown the total power in kilowatts; the total system power in kilowatts per ton; the compressor power in kilowatts per ton; and the building load in T.R. (Tons of Refrigeration).

With respect to the determination of these four values, the total system power in kilowatts is read directly from the kilowatt transducer in the supply main to the system while the remaining three items, system power in kilowatts per ton; compressor power in kilowatts per ton; and building load in T.R. are calculated by the flexible process controller of the present invention.

Shown at the bottom of FIG. 2, it can be seen how the screen display shows the operating condition of the entire sytem indicating whether the system is energized; the compressor delay time; cool down time in minutes; normal operation and the high and low chilled water supply temperature.

With respect to systems where there is only one chilled water loop, the flexible process controller will see it as a secondary loop in which case the data and speed control of the primary chilled water pump can be deleted from the screen. Additionally, in most systems where the cooling water pump speed is not varied either because it is impracticable or undesirerable, the data and speed control of that equipment can also be deleted although it may be maintained simply as a means for monitoring operation of the pump.

With respect to those systems where there is more than one working chiller or any of the equipment needs to be changed to variable speed, the data and speed controls of the duplicated equipment can be duplicated on the screen in order to determine initial values and thereafter modified as necessary.

Perameters of Operation

The Chiller Compressor

Referring now to FIGS. 3A and 3B there is shown the window display for the chiller compressor. In the manual mode the reference speed can be selected from zero to 100% of full speed by the user. In the automatic mode, the reference speed is determined by a control algorithm which uses the perameter "C1" and "Q". This control algorithm may be found in Table 1 below and may be 'functionally' derived by reference to FIG. 14.

TABLE 1

AT NO LOAD $$PD = P_c - P_i \alpha \left(\frac{v}{v^*}\right)^2 \cdot \frac{1}{V_o}$$

$$P_c - P_i = c_1^2 V_o \left(\frac{v}{v^*}\right)^2$$

$$\left(\frac{v}{v^*}\right)^2 = c_1^2 (P^o - P_i) V_c$$

$$\frac{V_o}{V_c} = \frac{T_o + 460}{T_c + 460} \; ; V_o = V_c \left(\frac{T^o + 460}{T_c + 460}\right)$$

$$P_o \simeq P_c; P_i \simeq P_e$$

$$\left(\frac{v}{v^*}\right)^2 = c_1^2 (P_c - P_e) V_c \left(\frac{T_o + 460}{T_c + 460}\right)$$

$$* (\text{Compressor Speed})_{NL} = (v/v^*) = c_1 (P_c - P_e)^{1/2} V_c^{1/2} \left(\frac{T_o + 460}{T_c + 460}\right)^{1/2}$$

(Compressor Speed)$_L$ = (Compressor Speed)$_{NL}$ (1 + QL)

WHERE: $c_1$ is a constant to be determined by actual tests and is a multiplier to the basic no load formula to give the minimum compressor speed at the sensed operating condition.
$(v/v^*)$ is ratio of compressor impeller tip speed between reduced and full motor speeds.
$P_c$ is condenser pressure in psia (sensor).
$P_e$ is evaporator pressure in psia (sensor).
$V_c$ is specific volume of refrigerant vapour in condenser at $P_c$ in ft$^3$/lbm. (look-up table).
$T_e$ is superheat temperature of refrigerant gas at compressor discharge in °F. (sensor).
$T_c$ is saturation temperature of refrigerant gas in condenser at $P_c$ in °F. (look up table).
$P_o$ is pressure at compressor impeller exit in psia.
$P_i$ is pressure at compressor impeller entry in psia.
$V_o$ is specific volume of refrigerant gas at compressor discharge in ft$^3$/lbm.
Q is the adder to the minimum compressor speed according to the load.
L is the Load.
NL is No-Load.

Accordingly, this reference speed is either experimentally determined or a function of the actual equipment utilized which is thereafter placed into the flexible process controller in order to suit each particular chiller in each particular system. In this fashion, it has been determined that maximum efficiency may be accomplished.

Similarly, the windows for "rated chiller load" and "rated condenser load" are constants placed into the flexible process controller and are determined from the original equipment manufacturers chiller data sheet. These values are for use by the fan and pump control algorithms. By viewing Table 1 above, it can be seen how chiller operation is actually modeled which is thereafter used in the flexible process controller to determine various set points, efficiencies and the like. Accordingly, similar algorithms are, as mentioned, utilized with respect to the fan and pump control. In this fashion, the flexible process controller can electronically determine the best operating efficiencies, conditions, load factors and the like, determine how the various systems must be controlled and in fact determine where the best changes may be made in order to maximize use of the entire system and components in view of the above criteria.

From the typical chiller plant layout of FIG. 8 it can be seen how the flexible process controller can fine tune not only each component of the entire HVAC system but the entire HVAC system.

Referring again to FIGS. 3A and 3B it can also be seen how the user may select values for a multitude of parameters including "temperature set-point" and start-up delay. As can be seen, the temperature set-point parameter is for the high/low chilled water temperature indicator while the start-up delay is for the purpose of allowing the flow and temperature conditions of the C.W (Cooling Water or Condensor Water), CH.W. (Chilled Water) and lubrication oil pumps to stabilize before the compressor starts. In this fashion, the start up delay may actually be minimized depending upon the actual then present conditions and therefore is automatically adjusted. It has been found this significantly limits the chance of damage to the equipment should an early start be tried as well as unnecessary delays during restart and the like.

Setting the Parameters

In both the manual and automatic modes the setting of the limit parameters is determined by the minimum compressor speed as a function of two parameters, "N-0" and "N-1". The value of these parameters is selected to ensure that the chiller does not surge during operation under load conditions. The N-0 is the reference speed when outside ambient wet bulb temperature is 32° F. (or similarly adjusted when the centigrade scale is utilized) while the parameter N-1 is that at 80° F. The algorithm for the chiller compressor in the flexible process controller forms the interpolation and extrapolation automatically so that minimum compressor speed is always maintained thereby saving on wear and tear and of course energy.

Figure 10:
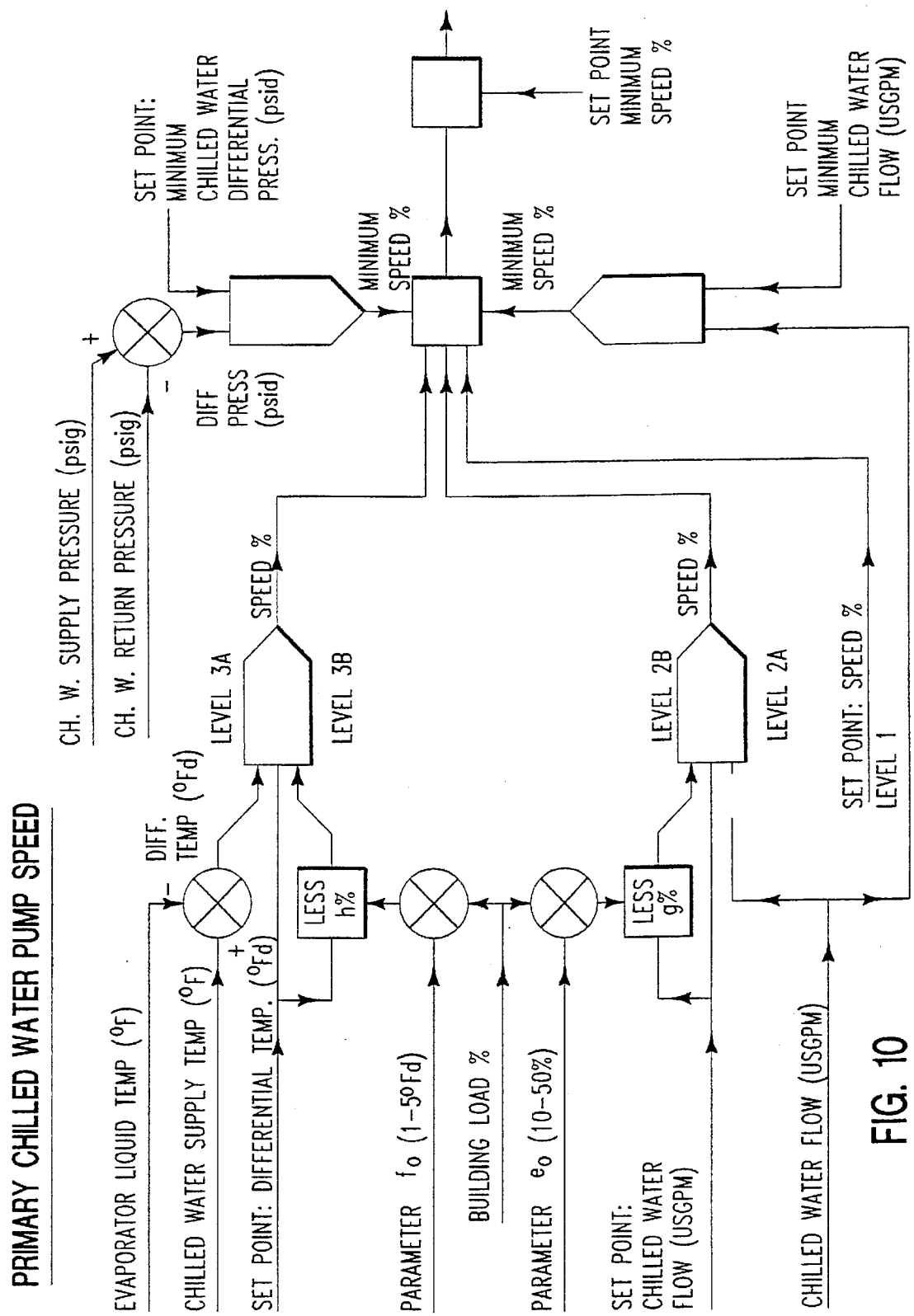
FIG. 10 is a process control or mathematical representation of a primary chiller water pump.
Figure 11:
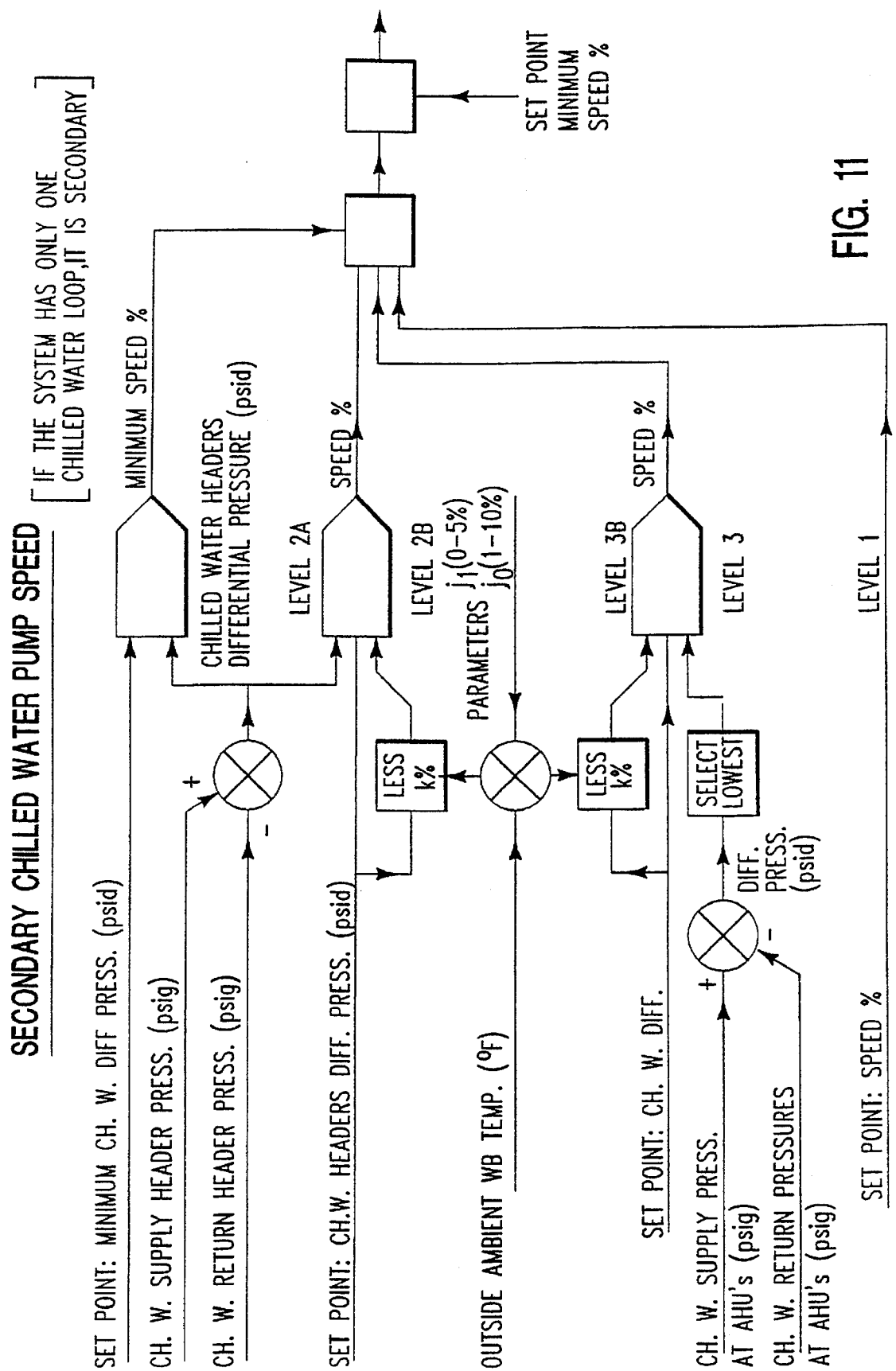
FIG. 11 is a process control or mathematical representation of a secondary chiller water pump.
Figure 12:
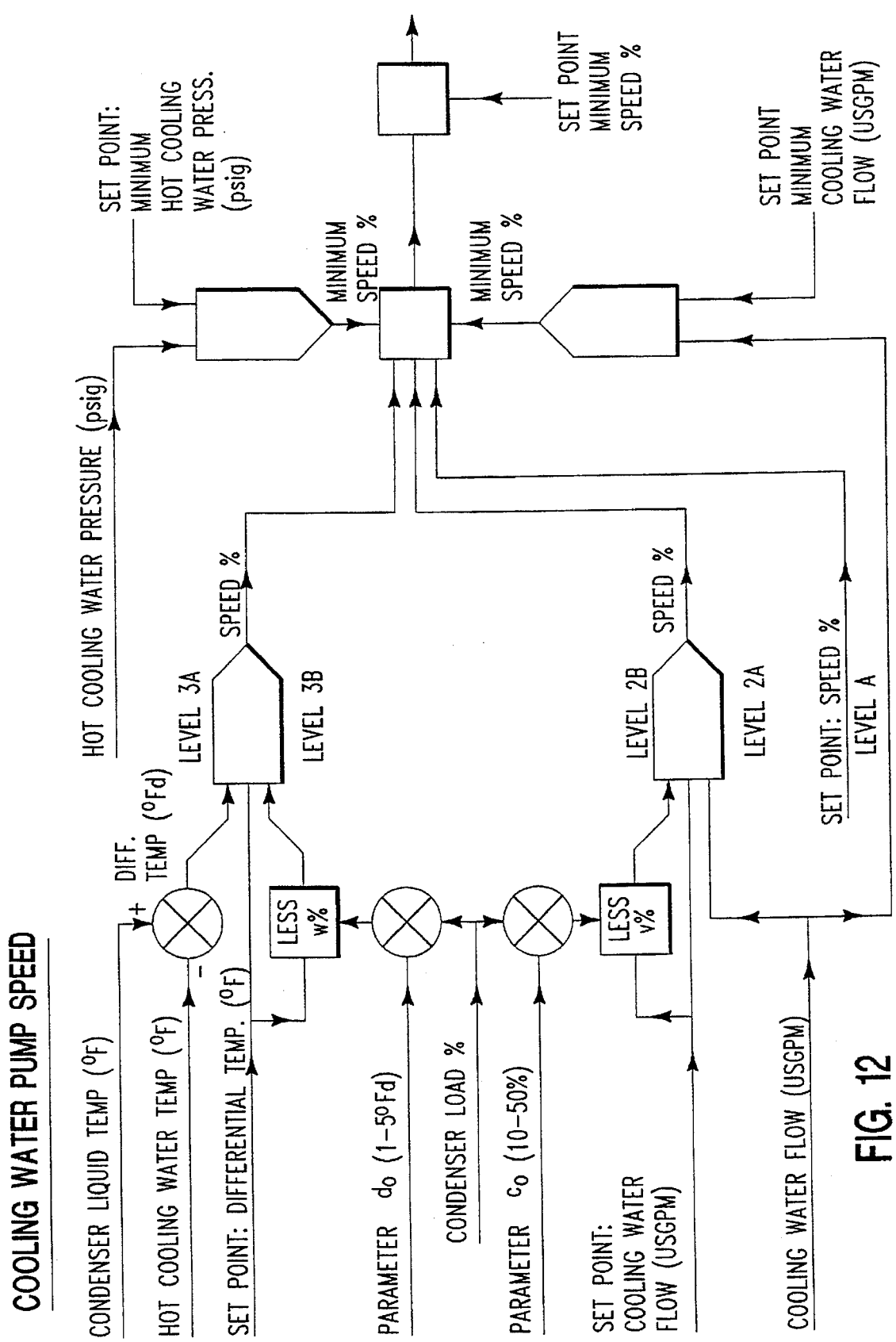
FIG. 12 is a process control or mathematical representation of a cooling water pump.
Figure 14:
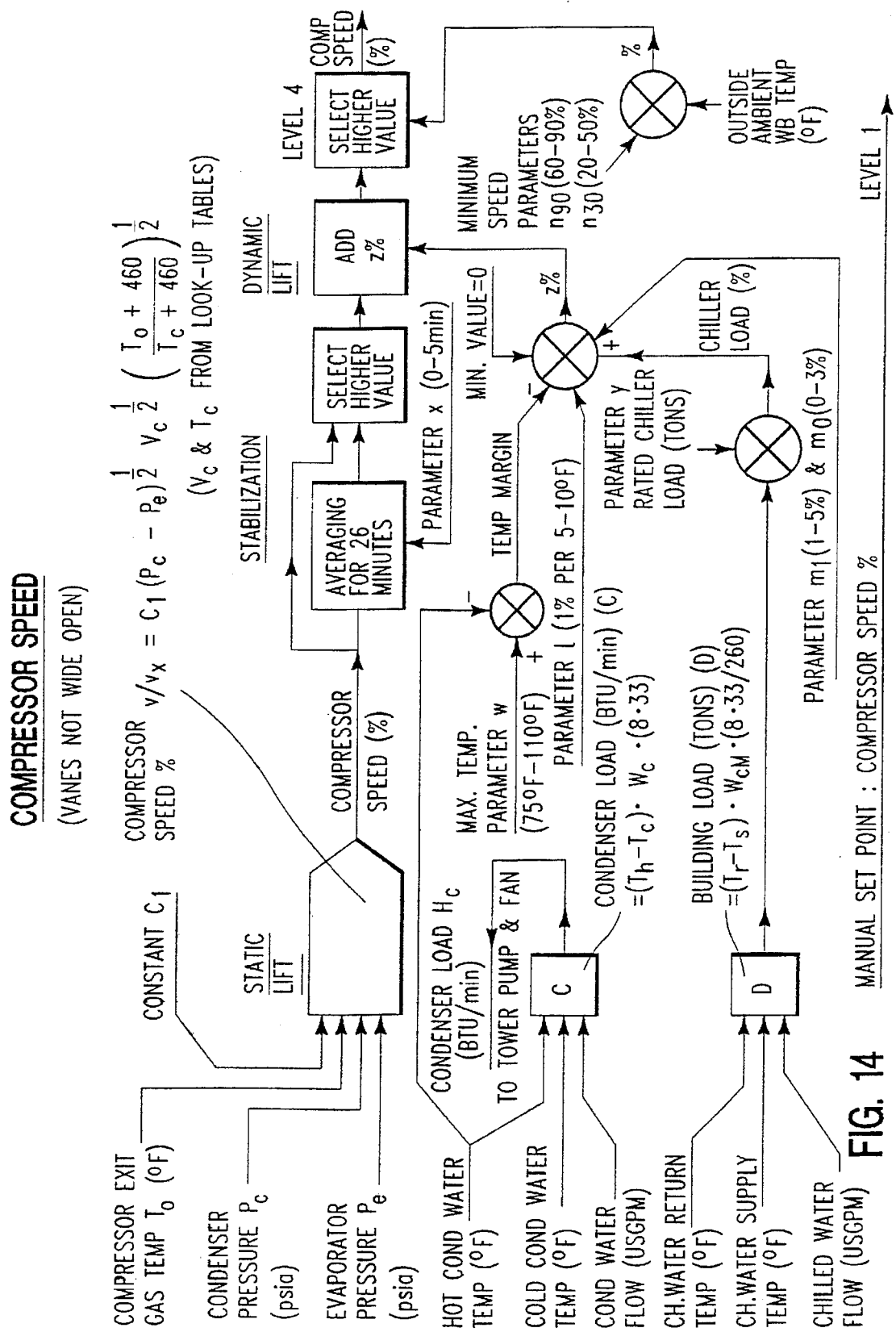
FIG. 14 is a process control or mathematical representation for compressor speed control.

Referring now to FIG. 14 an operating control algorithm or block diagram for determining compressor speed as a function of various inputs can be seen. It is to be understood that the constant or steady values such as those which are present in all HVAC systems or those which are present look up tables or readily integrated into the flow diagram here and hence logically programmed into the flexible process controller. Further, it can be seen how the various varying parameters such as temperature, flow rates and the like are correlated thereby providing the flexible process controller as well as the operator with the ability to monitor and control these various subsystems and adjacent subsystems as well as ensure that certain minimum and maximum limits are not exceeded. Similarly, similar flow diagrams are utilized with respect to other subsystems in the present invention and are therefore utilized with respect to the primary chilled water pump as found in FIG. 10, the secondary chilled water pump as found in FIG. 11, the cooling water pump speed as found in FIG. 12 and the tower fan speed as found in FIG. 14.

With respect to the vane opening limits as shown in FIGS. 3A and 3B, it has been determined that there are four limiting parameters. These limiting parameters are known and shown as "start-up"; "cool-down"; "normal operation"; and "shut-down". With the exception of the cool-down parameter, the remaining three parameters are utilized to prevent surging of the chiller compressor. The second parameter, cool down, is used for kilowatt demand shaving during the cool down period. These particular values are determined from a study of the actual operating literature supplied with the particular chiller or may be determined experimentally. In any event, these values are placed into the flexible process controller.

The Cooling Tower Fan Control Parameters

Referring now to FIGS. 4A, 4B and 4C there is shown a basic window screen and display configuration for the tower fan control. In this mode of operation, two modes are possible, manual and automatic. In the manual mode, the reference speed can again be selected from zero to 100% of full speed by the user.

There are two automatic modes; the cooling water temperature mode and the approach mode. With respect to the cooling water temperature automatic mode, the reference speed is determined by a control algorithm (FIG. 13) which is of course readily determinable by one skilled in the art. This control algorithm uses the parameters "cold" and "A-0". The cold parameter is the cold cooling water set point at full rated cooling water load. The A-0 parameter is the reduction in temperature of the above set-point at zero load. Accordingly, the algorithm which of course resides in the flexible process controller determines the values between the two automatically. It has been found that the A-0 parameter is useful in that at reduced load and when it is selected to 0.00, the fan speed would slow down to the minimum point necessary to maintain the set point temperature, thus saving the maximum amount of energy for the fan only. Should the approach be set to, for example, 5.00, the fan speed would slow down but not as much as the earlier setting of 0.00. However, since the set point temperature is correspondingly reduced, it has been found that the compressor head pressure would therefore be lower and therefore this saving would save a greater amount of energy.

With respect to the second automatic "approach" mode the reference speed is determined again by a control algorithm which resides in the flexible process controller. This control algorithm uses the parameters approach "B-0". This approach parameter is the approach set point in temperature differential at full rated cooling water load while the B-0 parameter is the reduction in temperature of the above set point at zero load. Again, the algorithm determines the values residing between these end points automatically. Similar to the A-0 parameter, at reduced load when the B-0 parameter is selected to "0.00" the fan speed would slow all the way down in order to maintain the set-point approach differential temperature thus saving the maximum amount of energy for the fan only. If it is selected at, for example, 5.00 the fan speed would not slow down as much as above but since the set point approach differential temperature is reduced the cooling water temperature is also reduced and the compressor head pressure would be lower. Therefore, this would save a greater amount of energy.

This therefore allows the user to determine the best automatic mode depending upon many factors such as outside temperature, building load, equipment design and the like. Alternatively, and without departing from the spirit and scope of the present invention, another algorithm can be utilized to determine which automatic mode is preferred under different times of the day, seasons or the like and therefore the relevant automatic mode may be determined within the flexible process controller itself.

Setting the Limit Parameters

Figure 13:
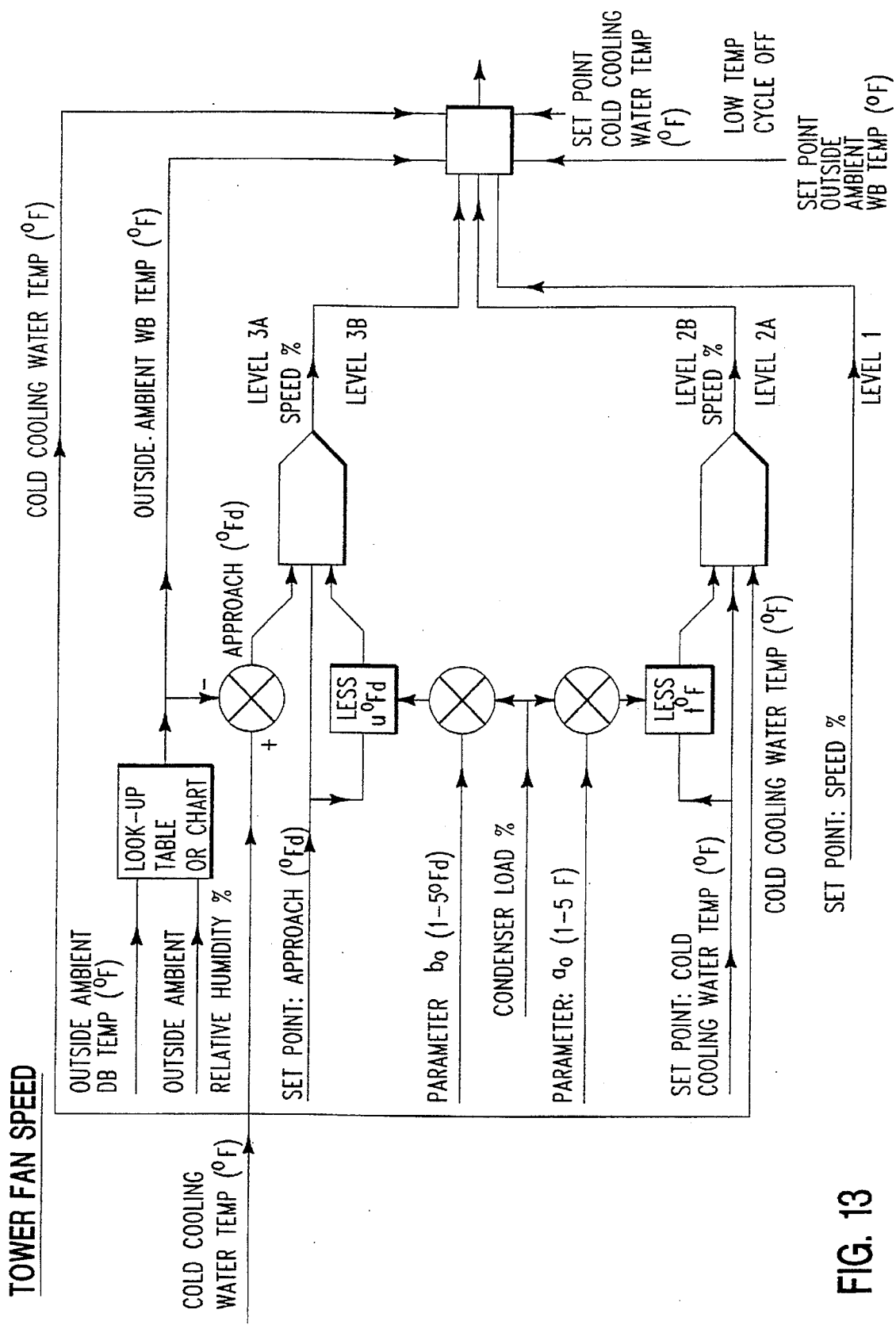
FIG. 13 is a process control or mathematical representation of a tower fan.

In the preferred embodiment of the present invention there are two limit setting parameters for all three of the above mentioned control modes. These parameters (and their input are shown in FIG. 13) are with respect to the outside ambient wet bulb temperature and the minimum cold cooling water temperature. With respect to the outside ambient wet bulb temperature, this parameter is utilized to ensure that the fan does not run when the outside ambient wet bulb temperature falls to below the selected value. This is done in order to prevent the cooling tower from actually freezing up with this value being inputable by the user in order to suit the various environmental operating conditions.

With respect to the minimum cold cooling water temperature, the fan is stopped when the cold cooling water temperature falls below the selected value, regardless of what reference speed the control calls for. Similarly, when in the automatic mode, the cooling water temperature desired value can not be lower than the set parameter here.

Additionally, as can be seen in FIG. 4A, a Proportional Integral Diffential (PID) loop parameter is used as a means for system stability. The PID approach is conventional and therefore readily known and available to one skilled in the art. Further, the PID approach is used in the various sub-system controls of the preferred embodiment of the present invention as may be seen below and by reference to the figures. The actual PID values are determined from the system configuration and are placed into the FPC.

Cooling Water Pump

Referring now to FIGS. 5A, 5B, and 5C the window screens for the manual and two automatic water pump operating modes can be seen. As with the other sub-systems, in the manual mode, the reference speed can be selected from zero to 100% of full speed by the user. With respect to the two automatic modes "flow" and "temperature differential" different parameters are utilized to work with the control algorithm (reference can be had to FIG. 12).

In the "flow" automatic mode, the reference speed is determined by a control algorithm which is again readily known and available to one skilled in the art and can be determined by reference to the operating characteristics and charts of the appropriate cooling water pump system. This control algorithm uses the parameters "flow" and C-0. The flow parameter is the cooling water set point in gallons per minute at full rated water load. The C-0 parameter is the reduction in percentage of the above set point at zero load. Again, the algorithm determines the value between full and zero loads.

With respect to the differential temperature automatic mode, the reference speed, as mentioned, is determined by the control algorithm. This algorithm uses the "differential temperature" parameter and D-0. The differential temperature parameter is the set point differential between cold and hot cooling water temperatures at full rated cooling water load. The D-0 parameter is the reduction in percentage of the above set point at zero load. Again, the algorithm would determine the values between full and zero load automatically.

When the C-0 parameter is set to "0.00" the pump speed is maintained at a constant full rated flow during the "flow" automatic mode. In the differential temperature automatic mode, where parameter D-0 is set to "0.00", the pump speed is controlled so as to maintain a constant full rated temperature differential. Accordingly, in the flow mode when parameter C-0 is set to 0.00 there is no energy savings experienced with respect to the pump. However, the hot cooling water temperature is naturally lowered and therefore the compressor head pressure is reduced. As a result, energy consumption is reduced with respect to the compressor and thereby the overall effect of the system is reduced energy consumption. Similarly, in the automatic mode when parameter D-0 is set to 0.0 there is no energy saving for the compressor. However, since the flow is reduced, the pumps energy consumption is reduced. In this fashion, energy reduction can be selected from unit to unit and therefore individual components such as the pump or the compressor can be operated at a power point where maximum efficiency occurs.

Accordingly, the combined power consumption characteristics may be reduced continuously or simultaneously such that the flow and differential temperatures will depend upon the individual operating characteristics of the associated apparatus and therefore around the maximum or minimum combined energy consumption point. Therefore, if there is a maximum point of energy consumption, it naturally follows that the optimum point is either at constant flow or at constant differential temperature. Therefore both parameters would be set to zero, hence the automatic mode which results in lower energy consumption, should be selected since it would provide the lower combined energy consumption. Similarily, if there is a minimum energy consumption point it can be reached via the flexible process controller simply by selecting either of the automatic modes and selecting the correct value for the corresponding parameter C-0 or D-0. It has been found that these selections can be made either by the user after gaining some experience or could eventually be automatically made by the flexible process controller.

Setting the Limit Parameters

There are three limiting parameters which should be set for the three referenced modes; minimum flow parameter, minimum hot cooling water pressure parameter, and minimum reference speed. With respect to the minimum flow parameter setting, this is set such that the pump speed will not be further reduced when the measured flow is below this selected value even though the operator may call for further reduction. This is to prevent the cooling water flowing in the condenser tubes from becoming laminar or freezing. As such, this parameter is set according to the original equipment manufacturers data sheet.

The minimum hot cooling water pressure parameter is utilized so that again the pump speed will not be reduced further when the measured hot cooling water header pressure is below this selected value, regardless of what the operator calls for. This is done so as to ensure that the spraying nozzles in the cooling tower have sufficient supply pressure for effective spraying and therefore obviously goes to the overall effectiveness and efficiency of the system. Again, this parameter is set according to the cooling tower's original equipment manufactures data sheet.

With respect to the minimum reference speed, the value for this parameter is selected so as to make sure that neither the minimum flow parameter or minimum hot cooling water pressure parameter is reached during normal operating conditions. This setting can be accomplished either by an experienced user making the selection after noting the minimum reference speed for a period of time or could be automatically selected by the flexible process controller.

The Primary Chilled Water Pump Control Parameters

Refer now to FIGS. 6a, 6b and 6c there is shown window icons for the primary chilled water pump. Here it can be seen how the three modes of operation, manual and two automatic are viewed. As before, in the manual mode, the reference speed may be selected from zero to 100% of full speed by the user. In the "flow" automatic mode the reference speed is determined by the control algorithm which uses the parameters "flow" and "E-0". This control algorithm is readily known and available to one skilled in the art and is derived in FIG. 10. The flow parameter is the primary chilled water flow set point at full rated chilled water load. The E-0 parameter is the reduction in percentage of the above set point at zero load. Again, the algorithm determines the values between full and zero load automatically.

With respect to the differential temperature automatic mode, the reference speed is determined by another control algorithm which uses the parameter "differential temperature" and "F-0". The differential temperature parameter is the set point differential between supply and return primary chilled water temperatures at full rated chilled water load. The F-0 parameter is the reduction and percentage of the above set point at zero load. Again, the algorithm determines the values between full load and zero load automatically.

The E-0 and F-0 parameters have been found necessary and are similar to those for the cooling water pump control as previously disclosed. At reduced load, when both parameters are set to 0.00 the pump speed is controlled so as to maintain constant full rated flow and constant full rated temperature differential for the flow and differential temperature automatic modes respectively.

When in the flow mode there is no energy savings in the pump. However, at that point the chilled water return temperature would be raised and therefore the compressor suction pressure is also raised thus reducing energy consumption. Inversely, when in the differential temperature mode, while there is no further energy saving for the compressor, since flow is reduced the pumps energy consumption is reduced. Therefore, reduced energy consumption can be directed to one component or the other as desired. This is the case with any of the subsystems.

With respect to conditions where the E-0 and F-0 parameters are set to a value other than 0.00, the combined power consumption characteristics incident to simultaneously reducing the flow and differential temperature will depend on of course individual characteristics of the associated equipment. Accordingly, they may therefore have a maximum or minimum combined energy consumption point depending upon the apparatus and the combination of the apparatus.

In the event that there is a maximum point, than the optimum point has been found as either constant flow or constant differential temperature and therefore both parameters should be set to zero. Therefore, the automatic mode which gives the lower combined energy consumption should be selected. In the event that there is a minimum point, this point can be reached by selecting either automatic mode and the correct value for the corresponding parameter E-0 or F-0.

Again, these selections can be made by either an experienced user or by the flexible process controller once it has built up a sufficient history of the operating characteristics and conditions of the HVAC system.

Setting The Limiting Parameters

There are again three parameters (reference can be had to FIG. 10) which must be considered as operating limits for all three mentioned control modes. The first of these parameters is the minimum flow parameter and is used such that the pump speed will not reduce below this minimum flow when the measured flow is below the selected value even though the controller may call for a further reduction. This is to prevent the chilled water flow in the evaporator tubes from becoming laminar or freezing and is initially set according to data from the chillers original and manufactures data sheet.

The minimum differential pressure parameter is the differential pressure across the pump and is used so that the pump speed will not be reduced below this value when the measured differential pressure across the primary pump is below the selected value regardless of what the control panel is calling for as a result of a users request. This is to ensure sufficient primary pressure is supplied to the secondary pump suction. Therefore, this parameter prevents inadvertent damage to other components in the system. Again, this selected value is made by the user according to the chilled water hydronic system design data sheet.

The minimum reference speed again uses a safeguard with respect to the above two minimum limits in that a value for this parameter is selected so as to make sure that neither of the above limits can be reached under normal operating conditions. This value can be chosen by the user after having some experience with the equipment or by the flexible processor controller after it has again built up a sufficient history of data.

Secondary Chilled Water pump

Control Paramaters

Referring now to FIGS. 7a, 7b and 7c there is shown icons indicating the control over the two automatic and one manual mode with respect to the secondary chilled water pump. It should be initially noted that in the preferred embodiment there is a primary and secondary chilled water pump. In the event that only one chilled water pump and hence water loop is utilized, the flexible process controller will see that loop as a secondary.

As with the other sub-systems of the present invention, the manual mode reference speed can be selected from zero to 100% of full speed by the user. Additionally, there are two automatic modes; the header press mode and the AHU's press mode. With respect to the header press automatic mode, the reference speed is determined by a control algorithm (the derivation of which can be seen in FIG. 11) which uses the parameters "header", "J-0" and "J-1". The header parameter is the set point differential pressure across the secondary chilled water supply and return headers, this parameter can be selected by the user according to the design data provided with the chilled water hydronic system manufacturer.

With respect to the AHU's press (pressure) automatic mode, the reference speed is determined by another control algorithm which uses the parameters AHU's, J-0 and J-1. The AHU parameter is the set point differential pressure across the inlet and outlet of the most critical air handling unit or, alternatively, that unit which requires the highest differential pressure for satisfactory operation. The selection of this set-point is made by the user and is taken from the design data supplied with the chilled water hydronic system.

In both automatic modes, "header press and AHU press (pressure) the parameters J-0 and J-1 represent the reduction and percentage of the set point at outside ambient wet bulb temperature for 30° and 80° Fahrenheit respectively. Again the algorithm does the interpolation and extrapolation automatically.

The J parameters mentioned are used and based upon the assumption that the building load is a function of the outside ambient wet bulb temperature. Accordingly, at low load the required differential pressure across the air handling units and therefore the headers is low. In addition to speed reduction caused by reduced chilled water flow at constant differential pressure, there is a further speed reduction caused by reduced differential pressure. Therefore power consumption is then further reduced according to the principles of affinity law as is readily known and available to one skilled in the art.

This reduction of differential pressure however, must be carefully handled so as to not be excessive. It has been found that when differential pressure is reduced, the flow through the air handling units is reduced. As a result, the inside ambient temperature rises and the thermostat calls for more flow. The result is therefore a downward overshoot of differential pressure. Accordingly, it has been found that the mentioned algorithm is necessary and corrects for this overshoot by speeding up the pump with the net result that little or no speed reduction is caused by reduced differential pressure.

These J parameter values can be experimentally determined or initially calculated by one and are readily known and available to one skilled in the art.

Setting the Limit Parameters

It has been found that two limiting parameters are necessary for all three control modes. The first of these is the minimum differential pressure across the headers. This value is selected such that the pump speed will not reduce further when the measured differential pressure across the supply and return secondary chilled water headers is below the parameter selected value even though the flexible process controller may call for a further reduction. This is necessary to ensure sufficient secondary differential pressure is provided at all times under all load conditions. This value may be selected by the user according to the chilled water hydronic system design data sheet.

The second parameter is with respect to the minimum reference speed of the water pump. In a fashion similar to that previously discussed, this minimum reference speed is a safeguard with respect to the above reference minimum limit and is a value which is selected to make sure that the pump speed is not lowered below that level under normal operating conditions.

Accordingly, the present invention produces a method and apparatus which is extremely flexible and coordinates power consumption and operability amongst various components of system or sub-system. However, it is to be understood that many variations of the present invention be practiced without departing from the spirit and scope of the present invention. For example, centralized processing may be utilized as well as programmable logic controllers having resident computational power may also be used. Additionally, various additional input sensors and the like may be utilized while the present system may be integrated directly into equipment as part of an onboard computer system. Initially, the present inventions may be directly incorporated into the digital drive unit. Accordingly, it is the intention that the present invention not be limited by the appended specification and preferred embodiment but only by the claims appended hereto.

What is claimed is:

1. A method for actively coordinating the operation of a process system having at least first and second process equipment components, each of the at least first and second process equipment components operating in response to a plurality of predetermined control parameters, said method comprising the steps of:

monitoring a plurality of predetermined sensor parameters corresponding to a process environment of the process system and producing environmental data values representative thereof;

controlling the first process equipment component by adjusting selected ones of the plurality of control parameters in response to the environmental data values and to a plurality of predetermined set-point parameters which relate to respective predetermined desired output values of the process system; and controlling the second process equipment component by adjusting selected ones of the plurality of control parameters in response to the environmental values and to the plurality of set-point parameters;

wherein the controlling of the second process equipment component is concurrent with the controlling of the first process equipment component and the controlling of the first and second process equipment components adjust the plurality of control parameters to optimize at least one parameter of the plurality of sensor parameters which one parameter is affected by each of the first and second process equipment components.

2. A method according to claim 1 wherein each of the plurality of control parameters has predetermined minimum and maximum values and the steps of controlling the first and second process equipment components adjust the selected ones of the control parameters by interpolating between the respective minimum and maximum values of each of the selected parameters.

3. A method according to claim 2 wherein the at least one parameter of the plurality of sensor parameters includes a measure of operational power consumed by the process system.

4. A method according to claim 2 wherein:

the plurality of sensor parameters define an instantaneous state of the process system;

the plurality of set-point parameters define a desired state of the process system; and the controlling of the first and second process equipment components adjusts the plurality of control parameters to minimize differences between selective ones of the plurality of sensor parameters and corresponding ones of the plurality of set-point parameters.

5. A method according to claim 4 wherein one of the plurality of sensor parameters is a measure of operational power consumed by the process system and the controlling of the first and second process equipment components adjusts the plurality of control parameters to minimize differences between the selected ones of the plurality of sensor parameters and the corresponding ones of the plurality of set-point parameters and to minimize the operational power consumed by the process system.

6. A device for actively coordinating the operation of a process system having at least first and second process equipment components, each of the at least first and second process equipment components operating in response to a plurality of predetermined control parameters said device comprising:

instrumentation means for monitoring a plurality of sensor parameters corresponding to a process environment of the process system and for producing environmental data values representative thereof;

flexible process control means for controlling the at least first and second process equipment components, said flexible process control means including:

first control means, for controlling the first process equipment component by adjusting selected ones of the plurality of control parameters, said first control means being responsive to the environmental data values and to a plurality of predetermined set-point parameters which relate to respective predetermined desired output values of the process system; and second control means for controlling the second process equipment component by adjusting selected ones of the plurality of control parameters, said second control means being responsive to the environmental data values and to the plurality of set-point parameters;

wherein the first control means operates concurrently with the second control means and the flexible process control means adjusts the plurality of control parameters to optimize at least one parameter of the plurality of sensor parameter values which one parameter is affected by each of the first and second process equipment components.

7. A device according to claim 6 wherein each of the plurality of control parameters has predetermined minimum and maximum values and the flexible process control means adjusts the selected ones of the control parameters by interpolating between the respective minimum and maximum values of each of the selected parameters.

8. A device according to claim 7 wherein the at least one parameter of the plurality of sensor parameters is a measure of operational power consumed by the process system.

9. A method according to claim 7 wherein:

the plurality of sensor parameters define an instantaneous state of the process system;

the plurality of set-point parameters define a desired state of the process system; and the flexible process control means adjusts the plurality of control parameters to minimize differences between selected ones of the plurality of sensor parameters and corresponding ones of the plurality of set-point parameters.

10. A method according to claim 9 wherein one of the plurality of sensor parameters is a measure of operational power consumed by the process system and the flexible process control means includes means for adjusting the plurality of control parameters to minimize the differences between the selected ones of the plurality of sensor parameters and the corresponding ones of the plurality of set-point parameters and to minimize the operational power consumed by the process system.

* * * * *